US012750560B2

(12) United States Patent
Spick et al.

(10) Patent No.: US 12,750,560 B2
(45) Date of Patent: Sep. 29, 2026

(54) APPARATUS AND METHODS FOR CONTENT DESCRIPTION

(71) Applicant: Sony Interactive Entertainment Inc., Tokyo (JP)

(72) Inventors: Ryan Spick, London (GB); Timothy Edward Bradley, London (GB); Guy David Moss, London (GB); Ayush Raina, London (GB); Pierluigi Amadori, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/440,024

(22) Filed: Feb. 13, 2024

(65) Prior Publication Data

US 2024/0284011 A1 Aug. 22, 2024

(30) Foreign Application Priority Data

Feb. 22, 2023 (GB) ..................................... 2302497

(51) Int. Cl.
*H04N 21/488* (2011.01)
*G06T 7/20* (2017.01)
(Continued)

(52) U.S. Cl.
CPC ........... *H04N 21/4884* (2013.01); *G06T 7/20* (2013.01); *G10L 13/08* (2013.01); *H04N 5/278* (2013.01); *G06T 2207/20084* (2013.01)

(58) Field of Classification Search
None
See application file for complete search history.

(56) References Cited

U.S. PATENT DOCUMENTS 9,495,614 B1 * 11/2016 Boman .................. G06F 16/29
10,522,147 B2 12/2019 Varner
(Continued)

FOREIGN PATENT DOCUMENTS

WO WO-2022270660 A1 * 12/2022

OTHER PUBLICATIONS

Khamparia et al., "An Integrated Hybrid CNN-RNN Model for Visual Description and Generation of Captions", Circuit, Systems, and Signal Processing (2020) 39: 776-788 (Year: 2020).*
(Continued)

*Primary Examiner* — Hung Q Dang
(74) *Attorney, Agent, or Firm* — Kilpatrick Townsend & Stockton LLP

(57) ABSTRACT

A data processing apparatus for determining description data for describing content includes: a video captioning model to receive an input comprising at least video images associated with the content, wherein the video captioning model is trained to detect one or more predetermined motions of one or more animated objects in the video images and determine one or more captions in dependence on one or more of the predetermined motions, one or more of the captions comprising respective caption data comprising one or more words for describing one or more of the predetermined motions, the respective caption data comprising one or more of audio data, text data and image data; and output circuitry to output description data in dependence on one or more of the captions.

20 Claims, 3 Drawing Sheets

(51) Int. Cl.

| | |
|---|---|
| ***G06V 10/764*** | (2022.01) |
| ***G06V 10/82*** | (2022.01) |
| ***G06V 20/40*** | (2022.01) |
| ***G06V 40/20*** | (2022.01) |
| ***G10L 13/08*** | (2013.01) |
| ***H04N 5/278*** | (2006.01) |
| ***H04N 21/84*** | (2011.01) |

(56) References Cited

U.S. PATENT DOCUMENTS

| | | | | |
|---|---|---|---|---|
| 10,999,566 | B1 | 5/2021 | Mahyar | |
| 2014/0328570 | A1* | 11/2014 | Cheng | G06F 16/43 386/241 |
| 2014/0369596 | A1* | 12/2014 | Siskind | G06V 10/85 382/158 |
| 2017/0115853 | A1* | 4/2017 | Allekotte | G06F 16/58 |
| 2017/0132526 | A1* | 5/2017 | Cohen | G06N 20/00 |
| 2017/0165565 | A1* | 6/2017 | Doptis | A63F 13/69 |
| 2018/0189572 | A1* | 7/2018 | Hori | G06N 3/044 |
| 2020/0129860 | A1 | 4/2020 | Adams | |
| 2020/0134316 | A1* | 4/2020 | Krishnamurthy | G06V 20/70 |
| 2023/0018621 | A1 | 1/2023 | Lin | |
| 2023/0274555 | A1* | 8/2023 | Simoncini | G06V 10/764 382/103 |

OTHER PUBLICATIONS

Combined Search and Examination Report for corresponding GB Application No. 2302497, 7 pages, dated Aug. 23, 2023.
EP24152229.1, "Office Action", Mar. 6, 2026, 9 pages.
Extended European Search Report for corresponding EP Application No. 24152229.1, 8 pages, dated Jun. 3, 2024.

* cited by examiner

APPARATUS AND METHODS FOR CONTENT DESCRIPTION

FIELD OF THE INVENTION

The present disclosure relates to the field of processing data. In particular, the present disclosure relates to apparatus, systems and methods for determining description data for describing content comprising video images.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Audio description techniques exist for providing a spoken description of visual information within a displayed content. For users with visual impairment, audio description can be crucial for their understanding of the content. Audio description techniques can generally be used to describe events, actions and other visual properties in a pre-recorded content, such as a movie or a television show for example, so as to improve usability of pre-recorded content for users with visual impairment and/or cognitive impairment.

Conventional audio description techniques rely on manual creation of descriptive transcripts for content and the use of human voice actors to obtain an audio recording. Such techniques can be labour intensive, time consuming and costly. In addition, such techniques have meant that audio description has been limited to use with pre-recorded content. Whilst other techniques may involve manual creation of descriptive transcripts by users and the use of computer programs for speech synthesis, such techniques are still time consuming and limited to use with pre-recorded content.

There is therefore a need to improve description of content comprising video images.

It is in this context that the present disclosure arises.

SUMMARY OF THE INVENTION

It is to be understood that both the foregoing general description and the following detailed description are exemplary, but are not restrictive, of the invention.

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
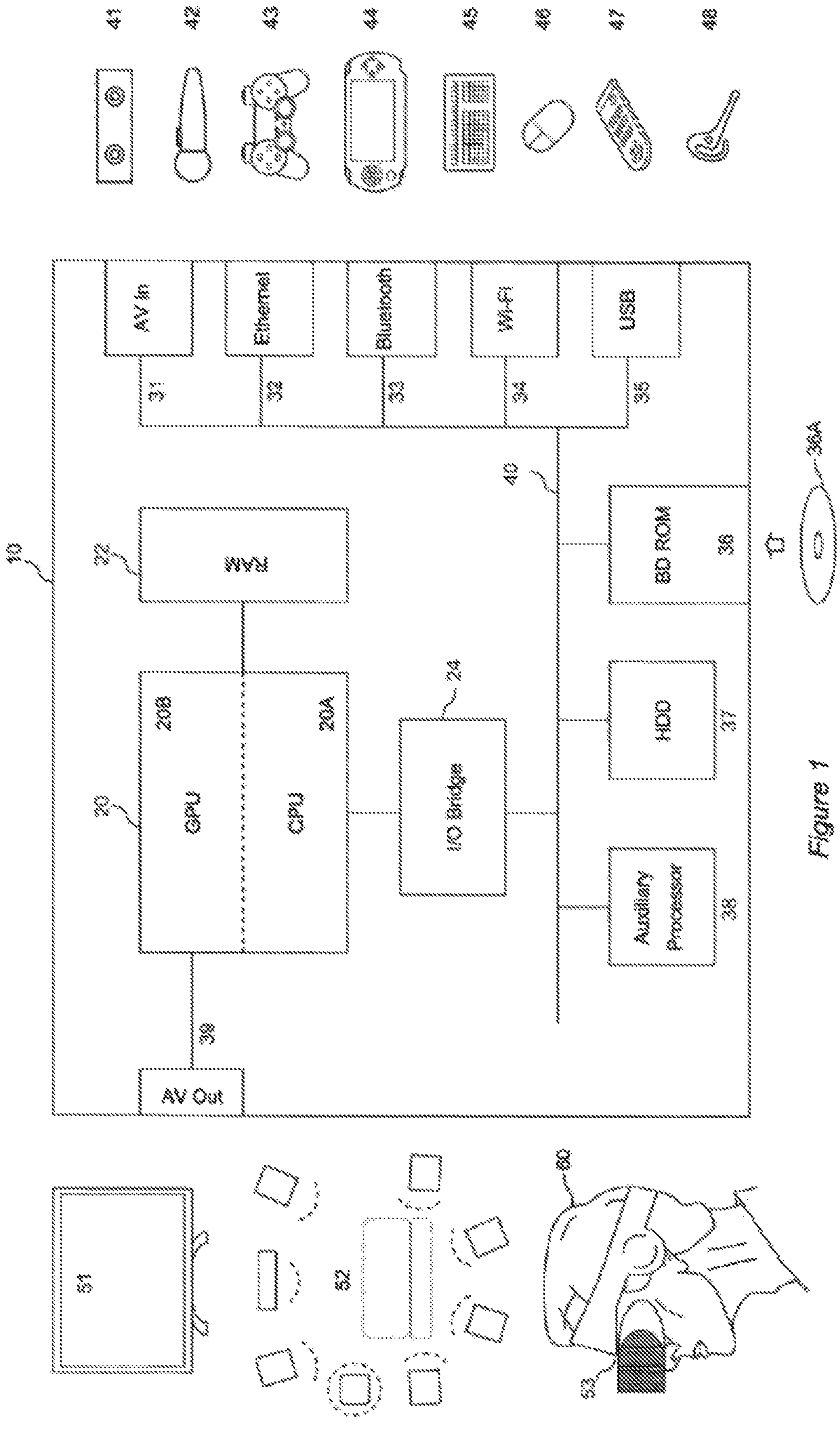
FIG. 1 is a schematic diagram illustrating an example of an entertainment device.

Embodiments of the invention will now be described, by way of example only, with reference to the accompanying drawings, wherein like reference numerals designate identical or corresponding parts throughout the several views, in which: FIG. 1 schematically illustrates an example entertainment device such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4® or DualSense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of an entertainment device suitable for performing processing for executing programs and generating images and audio for output to a user. The entrainment device may for example generate images for display by a display device such as the television 51 and/or the head mounted display unit 53.

Figure 2A:
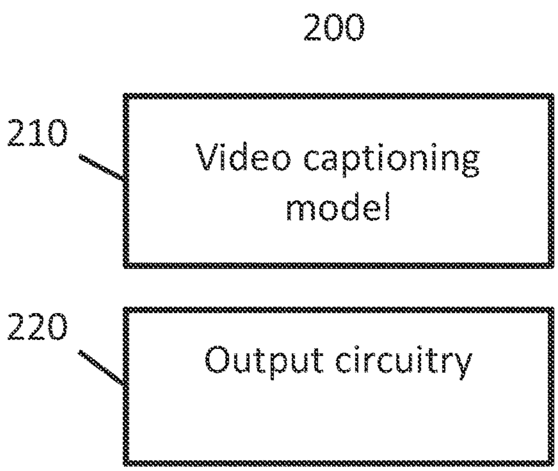
FIGS. 2*a* and 2*b* are a schematic diagram illustrating data processing apparatuses for determining text data for describing content.

FIG. 2*a* schematically illustrates a data processing apparatus in accordance with embodiments of the disclosure. The data processing apparatus 200 is suitable for determining description data for describing content and comprises: a video captioning model 210 to receive an input comprising at least video images associated with the content, wherein the video captioning model is trained to: detect one or more predetermined motions of one or more animated objects in the video images; and determine one or more captions in dependence on one or more of the predetermined motions in the video images, one or more of the captions comprising respective caption data comprising one or more words for visually describing one or more of the predetermined motions, the respective caption data comprising one or more of audio data, text data and image data; and output circuitry 220 to output description data in dependence on one or more of the captions.

One or more of the captions determined by the video captioning model 210 comprise respective caption data which comprises one or more of audio data, text data and image data. The audio data may comprise speech data comprising one or more words for visually describing one or more of the predetermined motions. The text data may comprise text characters indicative of letters for forming one or more words for visually describing one or more of the predetermined motions. For example, a caption may comprise respective caption data comprising one or more text files comprising text characters forming words for describing one or more of the predetermined motions. The respective caption data may comprise image data visually depicting one or more words for visually describing one or more of the predetermined motions. The image data may comprise symbols for visually describing one or more of the predetermined motions.

The data processing apparatus 200 is configured to output the description data in dependence on one or more of the captions determined by the video captioning model 210, in which the description data provides a visual description of one or more visual properties of the content including at least one or more predetermined motions represented in the content. In the present disclosure, visual description refers to providing information about the visual properties of the predetermined motions represented in the video images, and the visual description may be output to a user using, for example, audio data (such as an audio narration based on the description data) and/or by displaying a visual representation of the description data.

The description data may for example comprise one or more of text data, audio data and image data, as discussed in more detail later. The description data can be used to provide a description that can accompany the content (specifically, the video images for the content) when presenting the content to a user by describing visual properties associated with movements of one or more animated objects. In this way movements, such as actions associated with humanoid-characters, can be described to a viewing user when they occur within the content. This can be particularly beneficial for improving usability, understanding and enjoyment of content for a user with one or more impairments, such as visual impairments and/or cognitive impairments. For users with partial or full vision loss, the description data output by the output circuitry can be used to provide a visual description for the content that can provide an explanation of what is happening within the content to allow improved understanding of the content.

In some embodiments of the disclosure, the video captioning model 210 is operable to receive a video image sequence and determine a first caption (or one or more first captions) for a first portion of the video image sequence and determine a second caption (or one or more second captions) for a second portion of the video image sequence. For example, the first portion may comprise a humanoid character performing a running motion and the second portion may comprise the humanoid character (or another character) performing a different motion. The output circuitry 220 can thus output first description data indicative of the first caption (or one or more first captions) for output with the first portion of the video images and also output second description data indicative of the second caption (or one or more second captions) for output with the second portion of the video images for providing different visual descriptions for different portions of the content according to the different motions represented in those portions. Hence more generally, the first description data can be used to provide a visual description for the first portion of the video images and the second description data can be used to provide another visual description for the second portion of the video images. More generally, the received video images can be used to determine captions at any point during the content and the description data can be output by the output circuitry 220 for providing a description for different points during the content.

In some cases the video captioning model 210 may determine a single caption for a first group of image frames (e.g. a group of N image frames corresponding to a portion of the content with a duration of X seconds, e: g. X=5 seconds), in which case the description data that is output by the output circuitry 220 may be indicative of the respective caption data for the single caption. In the above example, the single caption may be determined for the content in advance as part of an off-line process and associated with the portion of the content. Alternatively, the single caption may be determined for the content in substantially real time during output of the content to a user, and the description data output in substantially real time. The output description data may comprise one or more of: text data, audio data and image data. For example, the output description data may comprise: the text data included in the respective caption data corresponding to the single caption; the audio data (comprising speech data) included in the respective caption data corresponding to the single caption (and/or audio data obtained using speech to text algorithms to generate audio data using the text data included in the respective caption data); and image data comprising a visual representation of the text data of the single caption.

In some cases the video captioning model 210 may determine two or more captions for a first group of image frames. For example, the first group of images may comprise two or more predetermined motions performed by a same animated object or two or more predetermined motions performed by two or more respective animated objects. More generally, a group of image frames may comprise any suitable number of animated objects and any suitable number of predetermined motions may be detected. Therefore, a plurality of captions may be determined for the group of image frames for visually describing visual properties associated with the predetermined motions. In such cases the description data that is output by the output circuitry 220 may be indicative of each of the captions determined by the video captioning model. For example, a first caption may comprise caption data comprising words such as "character A is jumping" and a second caption may comprise caption data comprising words such as "character B is shooting". Alternatively, the data processing apparatus 200 may output the description data in dependence upon one or more of the captions determined by the video captioning model 210, by performing one or more natural language processing techniques for one or more of the captions. For example, using the above example of the first and second captions, in some examples in response to both of the first caption and the second caption being determined for the same group of image frames, the output circuitry may output description data indicative of a combined caption such as "character B is shooting whilst character A is jumping". The above example refers to two captions being determined for a same portion of the content where the captions relate to respective animated objects. However, in some examples two or more captions may relate to a same respective animated object and more sophisticated natural language processing techniques may be performed to obtain a respective descriptive sentence that is based on the two or more captions for that same respective animated object. For example, respective predetermined motions associated with respective body portions of a given character may be detected, such as a head shaking motion and a kicking motion, and such captions can be used to obtain a combined caption for visually describing actions being performed by the given character.

Hence more generally, the output circuitry is configured to output description data for use in describing visual properties associated with one or more of the predetermined motions, and the description data is dependent on one or more of the captions determined by the video captioning model 210.

As explained previously, the description data that is output by the output circuitry may comprise one or more from the list consisting of: text data; audio data; and image data. In a simplest case, the description data may comprise text data (e.g. a text file) which can be processed by another device to generate an audio representation (e.g. using known text-to-speech algorithms) and/or a visual representation (e.g. text overlay in an image frame) of the text data. Alternatively or in addition, the data processing apparatus 200 itself may comprise functionality for processing caption data comprising text data to obtain audio data and/or image data and the description data may thus comprise text data and/or audio data and/or image data that is dependent on one or more of the determined captions. Alternatively or in addition, the caption data for one or more captions determined by the video captioning model 210 may comprise audio data such that the description data comprises audio data dependent on one or more of the determined captions.

In some embodiments of the disclosure, the data processing apparatus 200 may be provided as part of an entertainment device such as that described with reference to FIG. 1. More generally, the data processing apparatus 200 may be provided as part of a game console, smartphone device, laptop or a general purpose computing device.

In some embodiments of the disclosure, the data processing apparatus 200 may be provided as part of a server apparatus. In some examples, the server apparatus may be a streaming server provided for streaming content such as a movie, video game or television program.

Figure 2B:
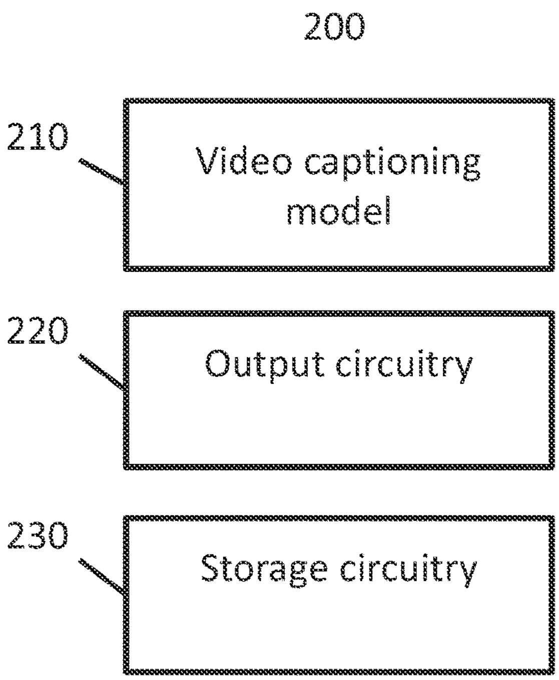

Referring to FIG. 2*b*, in some embodiments of the disclosure the data processing apparatus 200 may further comprise storage circuitry 230. In some cases the video images input to the video captioning model 210 may be video images associated with a content that has been downloaded by the data processing apparatus 200, such as a movie, television show or recording of a video game. The video images may therefore be input to the video captioning model 210 in advance of the video images being displayed to a user so that the text data (and/or audio data and/or image data) for describing the video images can be determined in advance and stored for subsequent use when the video images are displayed to the user. In particular, description data that is output by the output circuitry 220 may be retrieved from the storage circuitry 230 so as to output the description data during presentation of the content to a user.

Hence in some examples, the data processing apparatus 200 comprises the storage circuitry 230 to store description data in dependence on one or more of the captions determined by the video captioning model 210, and the output circuitry is configured to output the description data during presentation of the content to a user.

In some examples, in response to determining a caption for a predetermined motion in a plurality of image frames, the data processing apparatus 200 can be operable to assign a tag to the caption to associate the caption with the plurality of image frames. For example, the tag assigned to the caption may comprise timestamp information associated with the plurality of image frames. In this way, the determined caption and the tag can be stored (e.g. by the storage circuitry 230 or output for storage by another processing device) and then during presentation of the content to a user, the tag can be used to ensure that the caption is used at the appropriate time during the content. Hence, in some examples, the description data may comprise one or more respective captions and a tag assigned to a respective caption, in which the tag comprises timing information for indicating a timing for outputting the respective caption with respect to the video frames of the content. Hence more generally, one or more tags may be provided for controlling timing at which the description data is to be output during the presentation of the content to a user.

In some examples, the data processing apparatus 200 may be operable to obtain the description data and output the description data to a separate device (e.g. a display device such as a smart television) for use by the separate device when presenting the content. Hence, in some examples the data processing apparatus 200 may not comprise image display functionality. Alternatively, in some examples, the data processing apparatus 200 comprises a display unit that can be configured to output the video images for display and the output circuitry 220 can be configured to output the description data during the display of the video images. For example, the data processing apparatus 200 may comprise a display unit and one or more speakers and the description data can be output as an audible output and/or as a visual input (e.g. using words displayed overlaid with the video images). Of course, in order to assist users with visual impairment it is most desirable for the description data to be output so as to be audible to the user. Alternatively or in addition, the description data may be visually displayed to the user using a relatively large font size for ease or recognition. In some examples the data processing apparatus 200 may be provided as part of a display device (e.g. smart television device) that receives content either as streamed content or downloaded content.

In some embodiments of the disclosure, the data processing apparatus 200 is operable to determine the description data in advance of the content being presented to the user, by performing the techniques with respect to pre-recorded content. In some embodiments of the disclosure the data processing apparatus 200 is operable to receive a video stream (or a media stream including video data and audio data), for example via a wired and/or wireless communication such as via a wireless network, and the video stream can be input to the video captioning model 210 so that one or more captions for describing the content can be determined concurrent with the content being presented to the user (for example, in real-time or substantially real-time). In such cases the storage circuitry 230 may not be required and the output circuitry 220 may output the description data responsive to the determination performed by the video captioning model 210. Optionally, the storage circuitry 230 may also be provided for such cases to provide storage accessible to the output circuitry 220 for temporarily storing description data to be used by the output circuitry 220.

Figure 3:
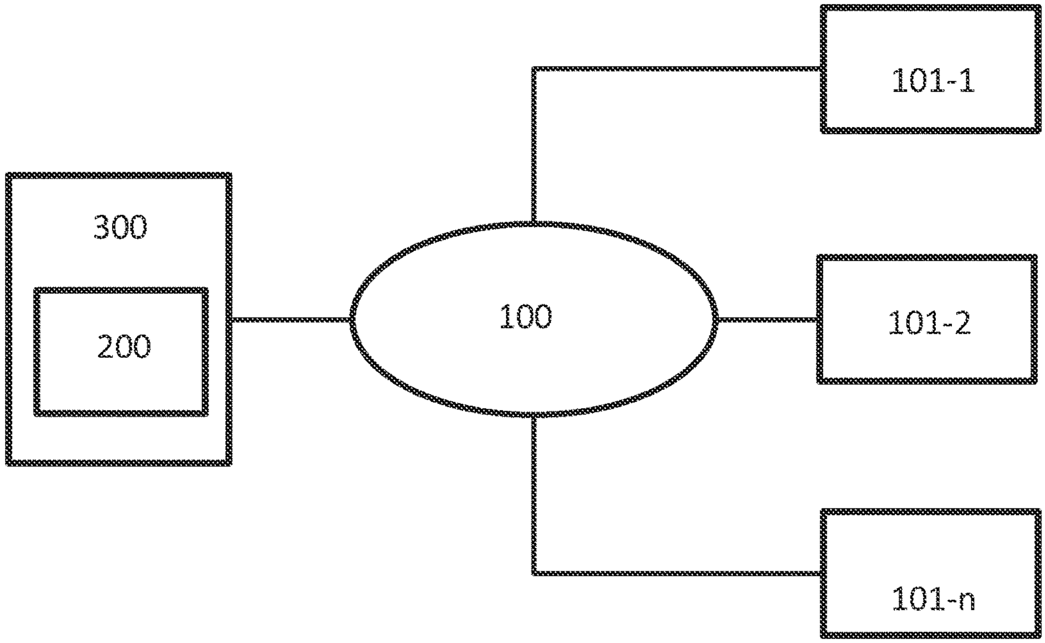
FIG. 3 is a schematic diagram illustrating a system.

FIG. 3 schematically illustrates an example of a system in which the data processing apparatus 200 is provided as part of a server apparatus 300. The system comprises the server apparatus 300 which communicates with the client devices 101-1, 101-2 . . . 101-*n* via the network 100. Whilst this example shows three client devices, the number of client devices is not particularly limited and there may be any suitable number of client devices (n may be any suitable value).

In the example of FIG. 3, the server apparatus 300 streams video data to one or more of the client devices 101-1, 101-2 . . . 101-*n* via the network 100. The data processing apparatus 200 may receive a video stream that is to be communicated via the network 100 (or at least some of the image frames of the video stream) and input the video stream to the video captioning model 210 for determining text data for describing the content. The client devices may be devices such as the entertainment device described with reference to FIG. 1, or other similar devices having display functionality such as a smartphone or tablet device or a general purpose computing device connected to a display unit. Hence, one or more captions can be determined by the data processing apparatus 200 and description data (e.g. text data and/or audio data) that is dependent on one or more of the determined captions can be output by the data processing apparatus 200 for output with the video stream to the client devices 101-1, 101-2 . . . 101-*n* via the network 100. FIG. 3 therefore represents an example in which the data processing apparatus 200 determines one or more captions and outputs the description data in real-time, or substantially real-time, to provide visual description for the streamed content.

In cases where the caption data comprises at least text data, the apparatus 200 may perform one or more processing operations with respect to one or more of the captions determined for a portion of the video frames so as to obtain the description data. Natural language processing may be used to combine words associated with two or more captions in a grammatically sensible manner. The data processing apparatus 200 may use one or more natural language processing algorithms for generating a grammatically correct expression using the caption data (e.g. text data and/or audio data) for two or more captions. Alternatively or in addition, the data processing apparatus 200 may use one or more text-to-speech algorithms for generating audio data in dependence upon text data for one or more of the captions. Alternatively or in addition, natural language processing may firstly be performed and the resulting expression may then be processed using one or more text-to-speech algorithms to generate an audio visual description. Alternatively or in addition, the data processing apparatus 200 may be operable to generate image data comprising one or more overlay images including a visual representation of the text data. Such overlay images can then be displayed with the video images to overlay a visual representation of the visual description with respect to the video images. Alternatively or in addition, the data processing apparatus 200 may be operable to generate image data by embedding a visual representation of the text data within the video images for the content.

In some examples, the output circuitry 220 may output the description data comprising text data for processing by another entity to thereby allow the another entity to generate a visual representation and/or audio representation of the text data for output to a user. For example, the output circuitry 220 may output the text data to a display device (e.g. via a wired and/or wireless communication such a Bluetooth®) so that processing for displaying the text data and/or outputting audio can be performed by the display device. Hence, more generally, in some examples the output circuitry 220 can be configured to output one or more text files comprising data indicative of one or more of the determined captions.

The type of content is not particularly limited and may be content for a movie, television show or video game, for example, and may be either pre-recorded content of streamed content. The video captioning model is configured to detect one or more predetermined motions of one or more animated objects represented in the video images, and the video images may include real-world environments or virtual environments. The animated objects may be real-world objects or computer-generated objects.

The video captioning model 210 is trained to detect predetermined motions that can be performed by real humanoid characters and computer-generated humanoid characters. In some examples, the video captioning model 210 may be specifically trained with respect to only one of real-world environments and computer-generated environments.

For example, a sequence of image frames may depict a real or computer-generated character as performing a walking motion or running motion or jumping motion, in which the pose of the character differs between image frames. The video captioning model 210 can be configured to detect a temporal variation in pose data as corresponding to a predetermined motion. The motion is pre-determined in that it is known to correspond to a particular type of motion. For example, characters may be detected as performing predetermined motions such as walking, jumping, crawling, crouching, waving, skidding, scuffing their feet, grabbing a ledge, etc. Each of these motions may be defined as a temporal variation in the pose and/or the transforms of one or more portions of the character. The pre-determined motion may be detected using machine learning techniques, as will be described later.

The video captioning model can thus detect occurrence of a predetermined motion within a plurality of successive video images and can determine one or more captions in dependence upon the predetermined motion. Generally, speaking the video captioning model is trained to determine one or more captions for a predetermined motion. For example, if a humanoid character is detected as performing a walking motion, one or more captions can be determined which include caption data being visually descriptive of the walking motion. In some examples, in addition to detecting the predetermined motion, the video captioning model can be configured to detect an intensity associated with the predetermined motion. For example, if a humanoid character is detected as performing a walking motion, the video captioning model may also detect an intensity such as a speed associated with the walking motion. One or more captions can thus be determined which include caption data being visually descriptive of the walking motion and the intensity of the walking motion. More generally, the video captioning model can be trained to detect a plurality of predetermined motions and for at least one of the predetermined motions the video captioning model can be trained to detect an intensity classification for the predetermined motion. For example, an intensity associated with a running motion or jumping motion may be used in this way.

The video captioning model uses a learned relationship between predetermined motions and corresponding captions. In some examples, a given predetermined motion may be mapped to a group of captions and further properties associated with the given predetermined motion and/or associated with the surrounding environment at the time of the given predetermined motion may be used for determining one or more captions from the group of captions for use in describing the given predetermined motion. For example, audio data and/or object recognition may be used for this purpose, as described later.

The relationship between predetermined motions and captions that include caption data providing visual description of predetermined motions can be determined using a machine learning model. In some embodiments of the disclosure, the video captioning model 210 comprises a machine learning model trained to map predetermined motions to captions comprising words for visually describing predetermined emotions. In specific examples, the machine learning model may be trained to map temporal variations in poses and/or transforms of one or more portions of a character to one or more corresponding captions. The machine learning model may employ a convolutional neural network (CNN) or recursive neural network (RNN), for example. In the case of the data processing apparatus comprising the machine learning model, the machine learning model may further be trained to detect the predetermined motions. That is, the machine learning model may learn to generate a high-level semantic representation for the motions performed in the video images and for high-level semantic representations corresponding to predetermined motions the machine learning model can learn to determine one or more captions that correspond to the representation. In some examples, the machine learning model can be configured, for a given detected predetermined motion represented in the video images, to calculate confidence values for respective captions and to determine one or more of the captions for which the confidence values exceed a threshold.

In some embodiments of the disclosure, the machine learning model is trained using training data comprising video images including predetermined motions of animated objects and corresponding captions comprising words for visually describing the predetermined motions. Captioned video data for a range of different types of content may be used as the training data. For example, known audio description techniques (also referred to as video description) exist in which narration (spoken description) is provided for portions of a recorded content to provide information for visual elements in the content to assist visually impaired users in following a story. Such narration is typically pre-recorded by narrators speaking into microphones to describe visual events. Such recorded content can be used as the training data for training the machine learning model. In particular, in the case of recorded content comprising video data and audio data representing narration for describing visual elements of the content, the audio data and/or text data (speech-to-text may be used to obtain text data) corresponding to the audio narration associated with the video images can be used for training purposes. Using such training data, the machine learning model can be trained to learn to map predetermined motions in the video images to one or more captions each comprising audio data and/or text data for describing the predetermined motions. Similarly, such training data may be used for training the machine learning model to detect predetermined motions. The training data may for example be obtained using pre-recorded content such as movies and television shows.

The above discussion refers to the video captioning model detecting one or more predetermined motions based on video images and determining one or more captions in dependence on one or more of the predetermined motions. In addition to using visually detected predetermined motions in video images, other properties associated with the content may be used for determining one or more captions for describing aspects of the content.

In some cases, alternatively or in addition to using a visually detected predetermined motion to determine one or more captions, a combination of a visually detected predetermined motion and a further property (e.g. object type, sound classification) may be used to determine one or more captions. Hence in some embodiments, a visually detected predetermined motion may be used solely on its own for determining one or more captions and/or a combination of a visually detected predetermined motion and another property may instead be used for determining one or more captions. The use of an additional property can improve the reliability of determining one or more captions that provide an accurate visual description and/or potentially allow the use of more detailed descriptions that describe predetermined motions in the context of properties for the environment.

In some embodiments of the disclosure, the video captioning model is trained to determine one or more captions in dependence on a visually detected predetermined motion and a further property associated with the content. Therefore, in some cases a combination of a visually detected predetermined motion and another property (e.g. a detected object type) can be mapped to one or more captions. Hence more generally, the video captioning model can be a so-called multi-modal video captioning model.

Figure 4:
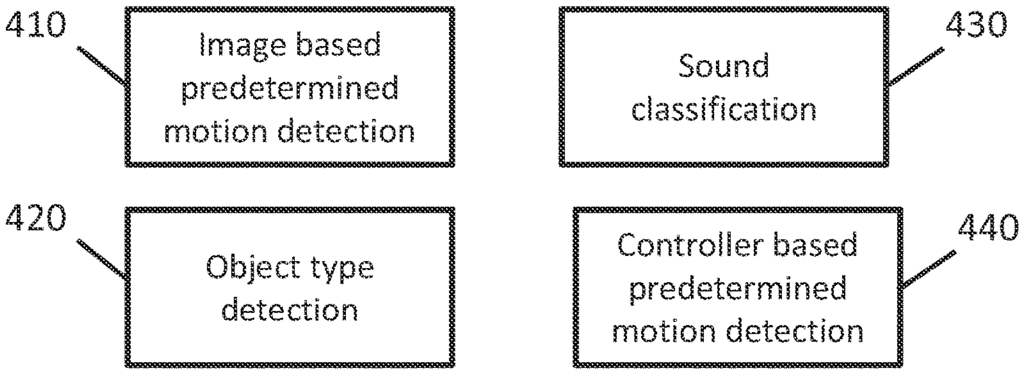
FIG. 4 is a schematic diagram illustrating multi-modal video captioning techniques.

FIG. 4 schematically illustrates example techniques by which the video captioning model 210 may determine captions. In addition to using image based predetermined motion detection 410 for determining captions, the video captioning model may use one or more of: object type detection 420; sound classification 430; and controller data based predetermined motion detection 440, for determining captions. Each of these techniques will now be discussed in turn.

Object Type Detection

In some embodiments of the disclosure, the video captioning model is configured to receive an input comprising at least video images associated with a content and the video captioning model is trained to: detect one or more predetermined motions of one or more animated objects represented in the video images; detect one or more object types represented in the video images; and determine one or more captions in dependence on one or more of the predetermined motions and one or more of the object types, at least some of the one or more captions comprising words for visually describing one or more properties of a predetermined motion with respect to a type of object. Such functionality may be performed as an alternative, or in addition to, using just predetermined motions to determine captions. For example, for some scenes the video captioning model may determine one or more captions in dependence upon a predetermined motion and for other scenes the video captioning model may determine one or more captions in dependence upon one or more of the predetermined motions and one or more of the object types.

The video captioning model can thus be configured to detect a type of an object included in the video images. For example, known machine learning image classification techniques may be used for this. In particular, the YOLO (You Only Look Once) algorithm for real-time object detection may be used for this purpose. Hence, an object type can be detected for one or more objects included in the video images and the object type can be used for determining one or more captions. In some examples, a condition of whether a predetermined motion is detected may be used to trigger object type detection with respect to the image frames including the detected predetermined motion to allow object type detection to be performed more efficiently. More generally, a predetermined motion can be detected and one or more object types associated with (i.e. present during) the predetermined motion can also be detected. Then using the combination of the predetermined motion and type of object, the video captioning model can determine one or more captions for visually describing one or more properties of the predetermined motion with respect to the type of object. For example, in response to detecting a running motion and an object type corresponding to a road, a caption that may be determined may comprise the words "the player is running across a road". In another example, in response to detecting a crouching motion and an object type corresponding to a box, a caption that may be determined may comprise the words "the player is crouching near a box". Similarly, in another example using training data comprising video images of characters walking down corridors accompanied by corresponding audio descriptions, the machine learning model can learn to map a combination of a walking motion and corridor (as an object type) to a caption including words such as "the user is walking down a corridor". More generally, one or more machine learning models may be trained using such training data to map combinations of predetermined motions and object types to corresponding captions.

In some embodiments of the disclosure, for at least one detected object type represented in the video images, the video captioning model is trained to: detect whether an image brightness associated with a representation of the detected object type in the video images is less than a threshold image brightness; and in response to the image brightness associated with the representation of the detected object type in the video images being less than the threshold image brightness, determine one or more captions in dependence on one or more of the predetermined motions and the at least one detected object type. In some cases, for at least some object types, the video captioning model can be configured to use a threshold image brightness to determine whether to provide description data for describing one or more predetermined motions associated with the object types.

The video captioning model can be configured to firstly detect an object type represented in a video image, and then detect whether that object type corresponds to a predetermined object type. When detecting that the object type corresponds to the predetermined object type, the video captioning model can be configured to detect whether the brightness associated with the object's representation in one or more of the video images is less than the threshold image brightness. When detecting that the brightness associated with the object's representation is less than the threshold image brightness, the video captioning model can be configured to determine one or more captions in dependence on one or more predetermined motions associated with the object and the detected object type. In this way, when an object type corresponding to a predetermined object type has a brightness below a threshold, such that observation of the object may be difficult for a user with visual impairment, one or more captions can be determined for generating the description data for providing a description with respect to the object. Hence more generally, output of description data can be selectively performed for the object corresponding to the predetermined object type according to a brightness, so that description data can be provided when the object appears with a low brightness, such as due to being in a low lit environment and/or a shadowed portion of an environment, and no description provided when the object appears with a brightness above the threshold image brightness.

The detection of the image brightness may be performed using known image brightness evaluation techniques, such as by detecting a silhouette of the object and averaging pixel values for the object. The threshold image brightness may be set to any suitable value. In some examples, the threshold image brightness may be set in response to a user input specifying a level for the threshold image brightness. A user may set the predetermined object type(s) for which the condition of the image brightness as described above is to be implemented by specifying certain object types.

In some examples, at least one predetermined object type may correspond to a humanoid character object type. In this way, description data may be output for describing predetermined motions associated with a character for situations when the character has a brightness below the threshold brightness, and subsequently when the character has greater brightness, and thus improved visibility, description data may stop being provided with respect to the character.

Hence more generally, in some embodiments of the disclosure, for at least one detected object type that is a humanoid character object type, the video captioning model is trained to: detect whether an image brightness associated with a representation of the detected object type in the video images is less than a threshold image brightness; and in response to the image brightness associated with the representation of the detected object type in the video images being less than the threshold image brightness, determine one or more captions in dependence on one or more of the predetermined motions and the at least one detected object type.

Sound Classification

In some embodiments of the disclosure, the input to the video captioning model comprises video images and audio data associated with a content. Therefore, as well as inputting the video images to the video captioning model, some embodiments comprise inputting the audio data to the video captioning model. In this way, captions can be determined based on both the video data and the audio data.

In particular, in some embodiments of the disclosure the video captioning model is configured to receive an input comprising video images and audio images associated with a content, and the video captioning model is trained to: detect one or more predetermined motions of one or more animated objects represented in the video images; detect, for at least one detected predetermined motion, one or more predetermined sound classifications corresponding to the detected predetermined motion; and determine one or more captions in dependence on the detected predetermined motion and one or more of the detected predetermined sound classifications. The video captioning model may thus be configured to detect predetermined sound classifications in the audio data occurring during (or within a certain time period of) a detected predetermined motion. Any suitable audio classification algorithm may be used. For example, known machine learning sound classification techniques may be used for this purpose. Example sound classifications may comprise classifications such as footstep sounds; body falling sounds; punching sounds; breathing sounds and non-linguistic speech sounds, as examples of humanoid character sound classifications: Of course, in some examples narrower sound classifications may be used such as running footstep sounds and walking footstep sounds and so on.

Hence more generally, one or more sound classifications can be detected as being associated with a detected predetermined motion, and the combination of the predetermined motion and the sound classification can be used to determine one or more captions. For example, in response to detecting a running motion and a sound classification corresponding to heavy breathing, a caption that may be determined may comprise the words "the player is running and breathing heavily". In some examples, one or more machine learning models may be trained using the above mentioned training data to map combinations of predetermined motions and sound classifications to corresponding captions.

The above example sound classifications refer to humanoid character related sounds for one or more characters in a content. The use of such sound classifications together with a detected predetermined motion can improve the reliability of determining one or more captions that provide an accurate visual description for the visual properties associated with the predetermined motion. For example, in addition to detecting a running motion, a sound classification corresponding to running footsteps and can be used for determining one or more captions with improved accuracy and reliability for appropriately describing the actions occurring in the content.

Alternatively or in addition, other sound classifications may be used that relate to different object sound classifications that may be represented in the content. Such object sound classifications may be used to detect different object types and may be used as an alternative to the above mentioned image-based object type detection techniques, or may be used in addition to the image-based object type detection techniques. Hence in some examples, sound classification techniques may be used in place of image-based object type detection. For example, possible example object sound classifications may comprise classifications such as vehicle sounds, pet sounds; gunshot sounds; blade sounds and so on. In this way, presence of one or more object types for the detected predetermined motion can be detected using the audio data, and the combination of the predetermined motion and the sound classification can be used to determine one or more captions. Other suitable sound classifications may relate to environmental-related sounds such as crowd sounds or possibly weather sounds, such as raining sounds, wind sounds and hailing sounds.

Hence more generally, in some embodiments of the disclosure, the video captioning model is trained to detect predetermined sound classifications comprising one or more from the list consisting of: one or more environmental sound classifications; one or more humanoid character sound classifications; and one or more object sound classifications.

In some embodiments of the disclosure, the video captioning model may determine one or more captions in dependence on a combination of a predetermined motion, an object type and a sound classification. In particular, the video captioning model can be trained to: detect one or more predetermined motions of one or more animated objects represented in the video images; detect one or more object types represented in the video images; detect one or more predetermined sound classifications represented in the audio data; and determine one or more of the captions in dependence on the detected predetermined motion, one or more of the object types and one or more of the detected predetermined sound classifications. For example, in response to detecting a running motion (as a predetermined motion), a road (as an object type) and road traffic (as a predetermined sound classification), a caption that may be determined may comprise the words "the player is running across a road with traffic".

Computer-Generated Characters

As explained previously the type of content is not particularly limited and may be content for a movie, television show or video game. In some embodiments of the disclosure, the video images comprise one or more animated objects, wherein at least one of the one or more animated objects comprises a computer-generated character. The video images may comprise computer-generated characters which may be non-player characters or player characters for a video game.

For example, a plurality of the video images corresponding to a portion of the content may comprise a first computer-generated character that is a player-controlled character controlled by a first player and a second computer-generated character that is a player-controlled character controlled by a second player. More generally, the video images may correspond to a video game played between a plurality of players. In some examples, the video images may correspond to a massively multiplayer online game (MMO) with the video images being generated according to a viewpoint of a player or a viewpoint of a spectator. For example, the video images may correspond to a video feed of a player's game which can be streamed to various other spectating users. In other examples, the video images may correspond to a single player video game played by a player with one or more non-player characters (NPCs).

Twitch® is an interactive live streaming service that can be used for streaming content such as video games. Spectator users (users that do not actively participate in the video game) can thus receive such streams to thereby watch video games played by other users. Such video streams can be input to the video captioning model and the description data obtained for the video stream can be output to provide spectators with a visual description for the content. Consequently, a spectator user having visual and/or cognitive impairment can receive the description data (e.g. in the form of audio data) for providing a visual description during the presentation of the video game to assist the spectator user in better understanding the actions of the computer-generated characters in the content.

In some embodiments of the disclosure the content is for a video game and the video images may include a virtual space (e.g. virtual game world) in which one or more computer-generated characters can move and interact. The video captioning model can be configured to receive an input comprising the video images and can be trained to detect one or more predetermined motions of one or more computer generated characters. In particular, predetermined motions associated with various portions of a virtual avatar (torso portion, head portion and limb portions) can be detected so as to detect predetermined motions such as running, walking, crawling, crouching, jumping, rolling, holding a weapon, aiming a weapon. Also, predetermined motions may be detected based on pose analysis of the virtual avatar and analysis of pose changes across a plurality of video images.

It will be appreciated that for computer generated characters, where many of the actions to be captioned are themselves scripted or predetermined (e.g. jumping animations, path following and the like), then meta data relating to the generation of the scene by the computer can be provided to the video captioning model to provide the information (or information supplementary to that described elsewhere herein, as applicable) used for generating the captions.

Controller Data Based Detection

In some embodiments of the disclosure, a computer-generated character is a user controllable computer-generated character, and wherein the video captioning model is configured to receive an input comprising video data and controller data associated with the computer-generated character. The controller data may be obtained from any conventional controller used for controlling a player character. For example, conventional handheld videogame controllers such as the DualShock 4® or DualSense® may output the controller data during the video game and the controller data can be input to the video captioning model.

The controller device may comprise various inputs for controlling a virtual avatar such as buttons, control sticks, triggers, motion sensors and touch pads. The controller data may thus be indicative of one or more user inputs such as one or more from the list consisting of: button press inputs, control stick inputs; trigger inputs; controller motion inputs and touch pad inputs. Hence, controller data for controlling a user controllable computer-generated character can be received and input to the video captioning model.

In some embodiments of the disclosure, the video captioning model is trained to: detect one or more predetermined motions of the computer-generated character in dependence on the controller data; and to determine one or more captions in dependence on one or more of the predetermined motions detected in dependence on the controller data. Hence, one or more captions may be determined depending on predetermined motions detected in the video images and/or detected in metadata associated with the computer generation of the video images, and optionally one or more additional captions (also referred to as further captions) may be determined depending on predetermined motions detected via the controller data. Therefore, in the case of the video images corresponding to a viewpoint of a player user, the captions determined via the video images can provide description data for describing what the player user is seeing, and the additional captions determined via the controller data from the controller used by the player user can provide description data for describing actions being performed by the player user. In this way the description data can provide a more complete description in the case of a video game for which the video images have a viewpoint corresponding to a viewpoint of a player user.

Of course, in some cases the video images for watching the video game played by the player user may have a viewpoint that includes the avatar of the player user, such as a third person viewpoint or a spectator viewpoint that is displaced from and follows the avatar of the player user, and in such cases the predetermined motions for the character associated with the player user can be detected via the video images. Hence, the video images for the video game may have viewpoints such as a first person viewpoint, third person viewpoint, or spectator viewpoint.

The video captioning model can be trained to learn a relationship between controller data for controlling a computer-generated character and predetermined motions performed by the computer-generated character. For example, training data comprising video images including predetermined motions and labels indicating corresponding controller inputs may be used for learning such a relationship. The training may be performed with respect to a specific video game. However, in some cases a look-up table may be provided for certain games that maps inputs to certain actions in the game.

Hence, in some cases video images may be used for detecting one or more predetermined motions and for determining one or more first captions. In addition, controller data may be used for detecting one or more predetermined motions and for determining one or more further captions (also referred to as second captions). This may be particularly beneficial for cases in which the player's character is only partially visible (or not visible) in the video images thereby hindering detection of predetermined motions performed by the player character. For example, a player's character may be partially occluded by one or more objects in the virtual space and in such cases the controller data can allow detection of one or more predetermined motions by the player's character.

Hence more generally, in some embodiments of the disclosure the video captioning model may receive and input comprising video images and controller data and may be trained to: detect one or more first predetermined motions of one or more animated objects represented in the video images; determine one or more first captions in dependence on one or more of the first predetermined motions; detect one or more second predetermined motions of a computer-generated character in dependence on the controller data; and determine one or more second captions in dependence on one or more of the second predetermined motions.

Whilst the above discussion refers to using the video images and the controller data separately from each other to determine captions, in some cases a combination of the two may be used for determining captions. Hence, in some embodiments of the disclosure, the video captioning model can be trained to detect one or more predetermined motions of the computer-generated character in dependence on the controller data and to determine one or more captions in dependence on one or more of the predetermined motions in the video images and one or more of the predetermined motions detected in dependence on the controller data. For example, in the case of a first person role playing or shooter game, for example, the controller data can be sued to detect predetermined motions by a first player and the video images can be used to detect predetermined motions by other players (or NPCs), and a combination of the player predetermined motion and the other player predetermined motions can be mapped to one or more captions. For example, actions (e.g. punches) performed by the first player can be detected via the controller data and similarly other actions performed by other characters (players or NPCs) can be detected via the video images and one or more captions describing the relationship between the actions can be determined. Of course, the combination may be used in a similar manner for determining other descriptions within a virtual space.

The following discussion relates to possibilities for the description data output by the output circuitry.

In some embodiments of the disclosure, the description data output by the output circuitry comprises text data for a respective caption determined by the video captioning model. The video captioning model can determine at least one caption according to any of the techniques discussed above, and the description data may comprise text data for the respective caption. The description data can thus be output and used by a user device during presentation of the content and the user device can use the text data in any suitable manner that is appropriate for the user.

Figure 5:
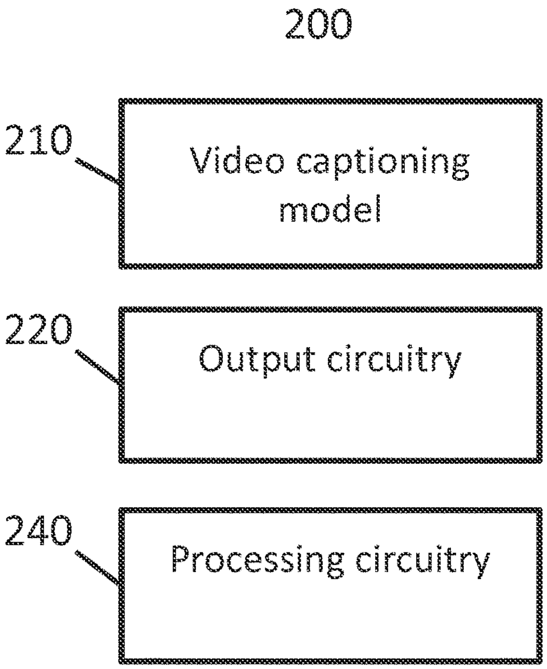
FIG. 5 is a schematic diagram illustrating another data processing apparatus.

Referring now to FIG. 5, in some embodiments of the disclosure, the data processing apparatus 200 comprises the video captioning model 210, the output circuitry 220 and processing circuitry 240. Optionally, the arrangement of FIG. 5 may also comprise the storage circuitry 230 discussed previously with respect to FIG. 2*b*.

The processing circuitry 240 can be configured to execute a text-to-speech algorithm to generate speech data in dependence upon the text data for one or more of the captions determined by the video captioning model 210. Hence, the data processing apparatus can in some cases output description data comprising audio data for providing the visual description with respect to the content using one or more captions comprising text data. Alternatively or in addition, caption data comprising audio data may be used so that captions comprising audio data are determined by the video captioning model, as discussed above.

In some embodiments of the disclosure the video captioning model is configured to determine a plurality of captions, and wherein the data processing apparatus is configured to execute a natural language processing algorithm to generate a combined caption in dependence upon at least some of the plurality of captions. For example, the above mentioned processing circuitry 240 may be configured to execute the natural language processing algorithm to generate a combined caption in dependence upon two or more captions.

Natural language processing techniques can be used to generate a combined caption that includes words from two or more determined captions with the words being arranged in a grammatically sensible order. In some examples, such natural language processing techniques may in fact be performed by the video captioning model itself (rather than the processing circuitry 240) so that the video captioning model determines a combined caption obtained by combining two or more captions initially determined by the video captioning model. Therefore, the natural language processing techniques may be performed as part of an intermediate step by the video captioning model to thereby determine one or more captions.

In some cases, the video captioning model may determine a plurality of captions for a same portion of the content. For example, a plurality of different predetermined motions associated with a plurality of characters in a video game may be detected and thus a plurality of different captions may be determined. Whilst the description data can be output to indicate the caption data for each of the respective captions, this may in some cases result in a description which feels unnatural to a user. For example, outputting a plurality of respective captions in order may not provide an appreciation of the relationships or semantic similarities between some of the respective captions. Consequently, the data processing apparatus 200 can combine two or more captions using a natural language processing algorithm that performs semantic analysis of at least some of the determined captions provide description data having a more natural feel for a user. For example, in response to the video captioning model determining a plurality of captions each comprising words for a sentence, the natural language processing algorithm may be executed to generate a semantic score (e.g. a value between 0 and 1) for two or more respective captions indicating how close they are in likeness of their meaning. In response to a semantic score that exceeds a threshold score, processing can be performed to generate a combined caption in dependence upon two or more of the captions. Among other benefits, this can be beneficial for providing a description that accounts for the relationships between the different predetermined motions (e.g. character actions) detected in the content.

In some embodiments of the disclosure, the video captioning model is configured to receive the video images associated with the content as a video stream. As explained previously, the video stream (or at least some of the images in the video stream) can be input to the video captioning model and description data can be output in real-time or substantially real-time. Therefore, whereas conventional audio description is limited to use with pre-recorded content, the techniques of the present disclosure can provide visual description for streamed content (as well as pre-recorded content) and the description data can be output in substantially real-time for the streamed content, thus improving accessibility for vision impaired users. In some examples, the video stream input to the video captioning model may be a live broadcast, such as a live television show. Moreover, beyond content for video games and movies, the techniques of the present disclosure can be applied for extending accessibility for various types of streamed content including streamed sports events, streamed exercise classes and live television, among others. As mentioned previously, the data processing apparatus 200 may be provided as part of a display device, such as a smart television device and thus streamed content received via a network can be input to the video captioning model and also output for display, and the description data can be output during the display of the content. Some embodiments may be implemented by computer software operating on a general purpose computing system, such as a so-called smart television, having internet connectivity and capable of executing one or more streaming service applications so that the description data can be provided with respect to content streamed using one or more of the streaming service applications. In some examples, one or more software components (e.g. plugins) may be provided for a given streaming service application for providing functionality for obtaining the description data.

In some embodiments of the disclosure the video captioning model is trained to: detect one or more first predetermined motions for a first time segment of a video stream; determine one or more first captions for the first time segment of the video stream; detect one or more second predetermined motions for a second time segment of the video stream, the second time segment being different from the first time segment and each of the first time segment and the second time segment comprising a plurality of video images; and determine one or more second captions for the second time segment of the video stream, and wherein the output circuitry is configured to: output first description data for visually describing one or more of the first predetermined motions for the first time segment in dependence on one or more of the first captions; and output second description data for visually describing one or more of the second predetermined motions for the second time segment in dependence on one or more of the second captions. Whilst the above discussion refers to two time segments, it will be appreciated that the techniques can be performed to provide description data throughout the duration of the streamed content.

In some examples, the content may comprise one or more dialogue portions and it may be undesirable for description data (e.g. in the form of audio data) to be output during dialogue portions of the content. Hence, in some embodiments of the disclosure the data processing apparatus 200 may be configured to detect dialogue portions for the content.

For cases where some or all of the description data is in the form of audio data, optionally the audio may be positioned on a virtual soundstage to track the objects or characters being described, so that the user can hear where they are as well as have a description of what is happening. Optionally alternatively the audio may be positioned in an area of the virtual soundstage not used by the content (or rarely used) so that the user can understand that comments from this area are descriptive and not dialogue. Optionally the video captioning system can use a default voice or a voice chosen by the user to be distinct from voices in the content.

For cases in which the data processing apparatus receives streamed content comprising video and audio data, the audio data can be analysed to detect dialogue portions. The output circuitry can be configured to output the description data in a manner that avoids outputting the description data during dialogue portions. In more detail, the data processing apparatus may comprise dialogue detection circuitry configured to output a signal indicating presence or absence of dialogue. In response to the video captioning model determining one or more captions and the description data being ready for output during a dialogue portion, the output circuitry may delay outputting the description data until a time at which the signal indicates absence of dialogue.

For cases in which the data processing apparatus receives content that is pre-recorded, the audio data can be similarly analysed to detect dialogue portions. The dialogue detection circuitry can similarly be configured to output the signal indicating presence or absence of dialogue for the content. An analysis of the gaps in the dialogue (i.e. portions for dialogue is absent) can be used to determine when to output the description data and the output circuitry can output the description data and associated time information indicative of a time with respect to the content at which the description data should be used. For example, the output circuitry may output first description data for a first portion of the content and also output offset time information in association with the first description data. Therefore, in cases in which the description data comprises a tag comprising timing information for indicating a timing for outputting the description data with respect to the video frames of the content, the offset time information may be used to define an offset with respect to the tag.

In some cases, in addition to detecting predetermined motion for animated objects and determining captions, the detected predetermined motion may also be used for predicting intentions for an animated object and a predicted intention may be used for determining one or more captions. In this way, future predetermined motions (e.g. actions by one or more characters) can be predicted and caption determining performed, and this can be particularly beneficial for allowing the visual descriptions to be provided to a user in substantially real-time. For example, a detected predetermined motion for which a character is detected as running towards a road can be used to predict a predetermined motion for which the character is running across the road and one or more captions can be determined using the predicted predetermined motion. Future predetermined motions can be predicted based on an analysis of the video images by firstly detecting a predetermined motion in the video images and inputting the predetermined motion (or the image sequence) to a machine learning model trained to map the predetermined motion to a predicted predetermined motion, for example.

Hence more generally, in some embodiments of the disclosure, the video captioning model is trained to: predict, for at least one detected predetermined motion, a predicted predetermined motion in dependence on the least one detected predetermined motion; and determine one or more captions in dependence on the predicted predetermined motion.

Figure 6:
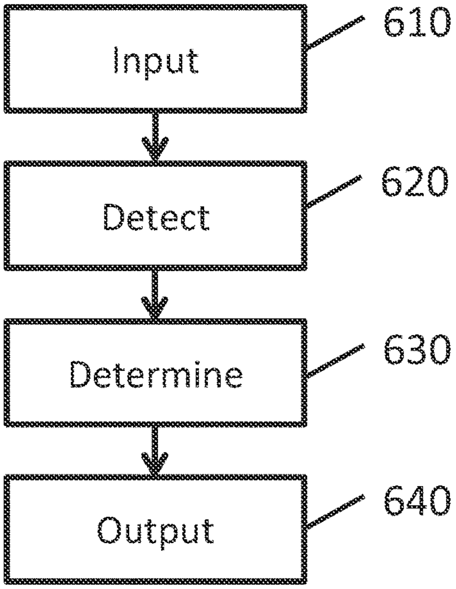
FIG. 6 is a schematic flowchart illustrating a method for determining text data for describing content.

FIG. 6 is a schematic flowchart illustrating a computer-implemented method for determining description data for describing content. The method comprises: inputting (at a step 610) to a video captioning model an input comprising at least video images associated with the content, the video captioning model being trained for detecting one or more predetermined motions of one or more animated objects in the video images and determining one or more captions in dependence on one or more of the predetermined motions, one or more of the captions comprising respective caption data comprising one or more words for visually describing one or more predetermined motions in the video images, the respective caption data comprising one or more of audio data, text data and image data; detecting (at a step 620), by the video captioning model, one or more predetermined motions of one or more animated objects in the video images; determining (at a step 630), by the video captioning model, one or more captions in dependence on one or more of the predetermined motions; and outputting (at a step 640) description data in dependence on one or more of the captions.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. An apparatus comprising:
one or more processors; and
one or more computer-readable media having stored thereon instructions that, when executed, cause the one or more processors to, at least:
receive an input comprising a video image associated with video game content, the video image showing an object in motion in the video game content;
receive controller data associated with the object in motion;
detect, utilizing a model, a predetermined motion of the object in motion;
map, utilizing the model, the predetermined motion to a plurality of captions based at least in part on the controller data associated with the object in motion, the model having been trained at least in part on a plurality of controller data associated with a plurality of objects in motion;
detect an object type represented in the video image, the object type associated with the predetermined motion; and
determine, utilizing the model, a caption of the plurality of captions based at least in part on the mapping and the object type, the caption describing the predetermined motion.

2. The apparatus according to claim 1, wherein the model comprises a machine learning model trained to map predetermined motions to captions comprising words for visually describing the predetermined motions.

3. The apparatus according to claim 2, wherein the machine learning model is trained using training data comprising video images including predetermined motions of animated objects and corresponding captions comprising words for visually describing the predetermined motions.

4. The apparatus according to claim 1, wherein the model is trained to:
detect the object type represented in the video image; and
determine one or more captions in dependence on the predetermined motion and the object type, at least some of the one or more captions comprising words for visually describing one or more properties of the predetermined motion with respect to the object type.

5. The apparatus according to claim 4, wherein, the model is trained to:
detect whether an image brightness associated with a representation of the object type in the video image is less than a threshold image brightness;
and in response to the image brightness associated with the representation of the object type in the video image being less than the threshold image brightness, determine one or more captions in dependence on one or more of the predetermined motions and the object type.

6. The apparatus according to claim 1, wherein the input further comprises audio data associated with the content.

7. The apparatus according to claim 6, wherein the model is trained to:
detect one or more predetermined sound classifications corresponding to the predetermined motion; and
determine one or more captions in dependence on the predetermined motion and one or more of the predetermined sound classifications.

8. The apparatus according to claim 7, wherein the model is trained to detect predetermined sound classifications comprising one or more of:
one or more environmental sound classifications;
one or more humanoid character sound classifications; and
one or more object sound classifications.

9. The apparatus according to claim 1, wherein the object is a computer-generated character.

10. The apparatus according to claim 9, wherein the computer-generated character is a user controllable computer-generated character, and wherein the model is configured to receive the input, the input further comprising controller data associated with the computer-generated character.

11. The apparatus according to claim 10, wherein the model is trained to detect one or more predetermined motions of the computer-generated character in dependence on the controller data and to determine one or more captions in dependence on one or more of the predetermined motions detected in dependence on the controller data.

12. The apparatus according to claim 11, wherein the model is trained to determine one or more captions in dependence on one or more of the predetermined motions detected in dependence on the controller data and on one or more of the predetermined motions in the video image.

13. The apparatus according to claim 1, wherein the instructions that, when executed, further cause the one or more processors to output description data comprising one or more of text data, audio data and image data for at least one respective caption determined by the model.

14. The apparatus according to claim 1, wherein the model is trained to determine a plurality of captions, and wherein the apparatus is configured to execute a natural language processing algorithm to generate a combined caption in dependence upon at least some of the plurality of captions.

15. The apparatus according to claim 1, wherein the model is configured to receive the video image associated with the content as a video stream.

16. The apparatus according to claim 15, wherein the model is trained to:
detect one or more first predetermined motions for a first time segment of the video stream;
determine one or more first captions for the first time segment of the video stream;
detect one or more second predetermined motions for a second time segment of the video stream, the second time segment being different from the first time segment and each of the first time segment and the second time segment comprising a plurality of video images; and
determine one or more second captions for the second time segment of the video stream, and wherein the instructions that, when executed, further cause the one or more processors to:
output first description data for visually describing one or more of the first predetermined motions for the first time segment in dependence on one or more of the first captions; and
output second description data for visually describing one or more of the second predetermined motions for the second time segment in dependence on one or more of the second captions.

17. The apparatus according to claim 1, wherein the model is trained to:
predict, for at least one predetermined motion, a predicted predetermined motion in dependence on the least one predetermined motion; and determine one or more captions in dependence on the predicted predetermined motion.

18. A method comprising:

receiving an input comprising a video image associated with video game content, the video image showing an object in motion in the video game content;

receiving controller data associated with the object in motion;

detecting, utilizing a model, a predetermined motion of the object in motion;

mapping, utilizing the model, the predetermined motion to a plurality of captions based at least in part on the controller data associated with the object in motion, the model having been trained at least in part on a plurality of controller data associated with a plurality of objects in motion;

detect an object type represented in the video image, the object type associated with the predetermined motion; and determining, utilizing the model, a caption of the plurality of captions based at least in part on the mapping and the object type, the caption describing the predetermined motion.

19. A non-transitory, computer readable storage medium containing computer software which, when executed, causes one or more computers to, at least:

receive an input comprising a video image associated with video game content, the video image showing an object in motion in the video game content;

receive controller data associated with the object in motion;

detect, utilizing a model, a predetermined motion of the object in motion;

map, utilizing the model, the predetermined motion to a plurality of captions based at least in part on the controller data associated with the object in motion, the model having been trained at least in part on a plurality of controller data associated with a plurality of objects in motion;

detect an object type represented in the video image, the object type associated with the predetermined motion; and determine, utilizing the model, a caption of the plurality of captions based at least in part on the mapping and the object type, the caption describing the predetermined motion.

20. The apparatus according to claim 1, wherein the object in motion is at least partially occluded in the video image and the model is trained to determine the predetermined motion or the plurality of captions based at least in part on the controller data associated with the at least partially occluded object in motion.

* * * * *